United States Patent [19]

Lohr, Jr. et al.

[11] 3,886,106

[45] May 27, 1975

[54] STABILIZATION OF POLYBUTADIENE RESIN

[75] Inventors: Delmar F. Lohr, Jr.; Edward Leo Kay; Walter Richard Hausch, all of Akron, Ohio

[73] Assignee: The Firestone Tire & Rubber Company, Akron, Ohio

[22] Filed: Apr. 16, 1973

[21] Appl. No.: 351,692

[52] U.S. Cl. .... 260/23.7 M; 260/42.44; 260/45.9 R

[51] Int. Cl. .............................................. C08d 7/10

[58] Field of Search .... 260/45.9 R, 23.7 M, 23.7 R, 260/566 AE

[56] References Cited

UNITED STATES PATENTS

| | | | |
|---|---|---|---|
| 2,620,323 | 12/1952 | Sayko | 260/45.9 R |
| 3,083,175 | 3/1963 | Safford et al. | 260/23.7 R |
| 3,658,637 | 4/1972 | Danielson | 260/23.7 M |
| 3,658,755 | 4/1972 | Moon et al. | 260/45.9 R |

FOREIGN PATENTS OR APPLICATIONS

| | | | |
|---|---|---|---|
| 1,227,162 | 4/1971 | United Kingdom | 260/23.7 R |

OTHER PUBLICATIONS

Kirk Othmer, *Encyclopedia of Chemical Technology* 2nd ed., Vol. 18, 1969, pp. 260–268.

G. Alliger et al., *Vulcanization of Elastomers*, 1964, pp. 245–248.

J. Del Gatto, *Materials and Compounding Ingredients for Rubber*, 1968, p. 82.

*Primary Examiner*—V. P. Hoke

[57] ABSTRACT

The incorporation of aromatic-nitroso compounds into a polybutadiene resin greatly enhances the resistance thereof to thermo-oxidative deterioration.

2 Claims, No Drawings

STABILIZATION OF POLYBUTADIENE RESIN

FIELD OF THE INVENTION

This invention relates to butadiene polymer and copolymer resins, and more particularly to increasing the resistance of such resins to deterioration of the mechanical properties upon exposure to heat and air.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

| | Parts by Weight |
|---|---|
| Polybutadiene or copolymer resin | 100 |
| An aromatic nitroso compound or p,p'-quinonedioxime compound | 0.5–5.0 |
| A metal soap | 0.5–5.0 |
| the composition being cured by heating with presence of: | |
| A peroxide curing agent | 0.5–6.0 |

The above ingredients are, of course, exclusive of other filling, reinforcing and compounding ingredients such as glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60 percent, based on the copolymers, of styrene. Also minor proportions, say up to 15 percent based on the copolymer of other ethylenically unsaturated compounds may be incorporated in the copolymers. These resins are usually prepared by (co) polymerizing the monomers by means of free radical or anionic catalysts to a relatively low molecular weight, say 1,000–200,000, so that they are of at least a flowable consistence. These low molecular weight (co) polymers are then incorporated with any desired fillers, reinforcing fibers or fabrics, pigments, etx., peroxide or other curing agents if desired, etc., and the composite is cured under heat and pressure to produce the desired finished article.

More particularly, there have recently been developed a class of polybutadiene resins having at least 40 percent, and preferably at least 60 percent by weight, of butadiene in the polymer molecule, and having at least 80 percent by weight of the butadiene therein in the vinyl type of butadiene repeating unit structure. The average molecular weight (determined by intrinsic viscosity measurement) is at least 12,500 and the molecular weight distribution is such that at least 50 percent, and preferably 90 percent, of the polymer has a molecular weight above 10,000 and at least 95 percent has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80 percent of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C). Obviously, the higher the temperature the shorter will be the curing time required. Generally at 350°F. (177°C.) a satisfactory cure is obtained in less than four minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing or cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

The Aromatic Nitroso Compounds

Because of their commercial availability, the preferred aromatic nitroso compounds are poly-para-dinitrosobenzene, a product of du Pont designated Polyac, and N-(2-methyl-2-nitropropyl)-4-nitrosoaniline, a product of Monsanto Chemical designated Nitrol.

Other aromatic nitroso compounds which may be used include: nitrosotoluene, ortho, meta or para-nitrosototoluene, the various isomers of nitrosoxylenes, etc.

Various N-substituted derivatives of 4-nitrosoanilines such as N-methyl, N-ethyl, N-propyl, N-isopropyl, etc. should also be applicable. Generally, all N-monosubstituted 4-nitrosoanilines should function as stabilizers in our invention.

We also have determined that p-quinonedioxime derivatives are effective antidegradants for polybutadiene resins as herein defined.

The preferred derivative based on commercial availability is p,p'-dibenzoylquinonedioxime which is commercially available from Uniroyal Chemical under the trade name of Dibenzo G-M-F. Other derivatives of p,p'-quinonedioxime which may be used include: diacetyl, dipropionyl, etc. Generally, the diacyl derivatives containing from two to sixteen carbon atoms may be used. The carbon atoms may be arranged as a straight chain, branched chain or in a cyclic configuration or combinations of these configurations.

The Cured Resins

The cured resins produced in accordance with this invention have exceptional resistance to thermoxidative deterioration of physical properties, particularly modulus and flexural strength, upon long time exposure at high temperatures, i.e., temperatures above 400°F. and up to 700°F. Thus, the products, upon exposure to a temperature of 600°F. for 100 hours will retain upwards of 80 percent of their modulus and upwards of 60 percent of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

| | Parts by Weight |
|---|---|
| Polybutadiene* | 100 |
| Silica | 380 |
| Vinyl triacetoxysilane | 3 |
| Dicumyl peroxide | 3 |
| Hexane | 150 |
| Calcium Stearate | (per Table I) |
| Experimental antidegradant | (per Table I) |

*90% of butadiene units in 1,2-configuration; molecular weight parameters $M_w$ = 29,000, $M_n$ = 23,000, DSV = 0.3.

A series of compositions was made up in accordance with the above schedule, varying the calcium stearate and experimental stabilizer in the several compositions as indicated in the following table. In the case of each composition, all of the ingredients, in the proportions selected for that composition, were thoroughly mixed together, and the mixture poured into an evaporating dish to the depth of 0.5 inch. The dish was then placed in a vacuum oven, where the hexane was removed at 125°F. under a pressure of 1–5 mm. of mercury absolute. Each such dried composition was then removed and broken up, and molded in a compression mold into several test bars 1 × 3 × 0.1. Temperature of molding was 350°F., total load on the die was 10–20 tons normal to the 1 × 3 face, and time was four minutes. The modulus and flexural strength was determined upon control bars from each composition, and the average recorded in the table.

The incorporation of hexane in the mix was a matter of convenience for preparing relatively small samples in the laboratory. On an industrial scale, the components of the mixture could be mixed without hexane solvent as a matter of economics.

TABLE I

STABILIZING EFFECT OF EXPERIMENTAL ANTIDEGRADANTS

| | Forced-Air Oven Aging at 600°F., 100 Hours | | | | | |
|---|---|---|---|---|---|---|
| | Flexural Modulus psi X$10^{-6}$ | | | Flexural Strength, psi | | |
| Test Sample | Unaged | Aged | % Retained | Unaged | Aged | % Retained |
| 1. Control, no stabilizer | 1.31 | 0.12 | 9 | 11,100 | 1,100 | 10 |
| 2. Control plus Ca Stearate, 3.0 phr | 1.40 | 1.11 | 79 | 10,700 | 7,200 | 67 |

TABLE I – Continued

STABILIZING EFFECT OF EXPERIMENTAL ANTIDEGRADANTS

| | Forced-Air Oven Aging at 600°F., 100 Hours | | | | | |
|---|---|---|---|---|---|---|
| | Flexural Modulus psi X10$^{-6}$ | | | Flexural Strength, psi | | |
| Test Sample | Unaged | Aged | % Retained | Unaged | Aged | % Retained |
| 3. Sample No. 2 plus 2.0 phr of stabilizer: | | | | | | |
| A | 1.30 | 1.20 | 92 | 12,200 | 8,500 | 70 |
| B | 1.39 | 1.25 | 90 | 13,000 | 9,000 | 69 |
| C | 1.40 | 1.15 | 82 | 12,300 | 8,300 | 67.5 |

Stabilizer A is (Polyac): poly-p-dinitrosobenzene.
Stabilizer B is (Nitrol): N-(2-methyl-2-nitropropyl)-4-nitrosoaniline.
Stabilizer C is (Dibenzo G-M-F): p,p'-dibenzoylquinonedioxime.

As shown by the data summarized in Table I, the experimental stabilizers significantly improved the flexural modulus retention of the test specimens as compared to the control which did not contain a stabilizer (Test Sample 1). A moderate improvement in flexural modulus retention was obtained with the experimental stabilizers as compared with the control that contained 3.0 phr of calcium stearate (Test Sample 2). We have observed that calcium stearate does effect a stabilization of the resins of this invention.

It should also be noted that the experimental stabilizer effected an increase of more than 1,000 psi flexural strength to the unaged experimental test specimens as compared to the controls. This increase in flexural strength retention is reflected in a higher absolute flexural strength for the aged experimental samples although the actual percent strength retained is only slightly higher than the controls.

What is claimed is:

1. A composition curable to a hard resin having enhanced resistance to thermo-oxidative deterioration of its mechanical properties due to the presence of p,p'-dibenzoyl-quinonedioxime, said composition comprising

| | Parts by Weight |
|---|---|
| A butadiene polymer or copolymer | 100 |
| Vinyltriacetoxysilane | 0.05–5.0 |
| Silica | 100–500 |

– Continued

| | Parts by Weight |
|---|---|
| [An aromatic nitroso or a p-quinonedioxime compound of the class consisting of: N(2-methyl-2-nitropropyl)-4-nitrosoaniline, poly-p-dinitrosobenzene, and ] | |
| p,p'-Dibenzoyl-quinonedioxime | 0.5–5.0 |
| Calcium stearate | 0.5–5.0 |
| Dicumyl peroxide | 0.5–6.0. |

2. A peroxide-cured resin highly resistant to thermo-oxidative deterioration of physical properties due to the presence of p,p'-dibenzoyl-quinonedioxime, said resin containing therein

| | Parts by Weight |
|---|---|
| A butadiene polymer or copolymer resin | 100 |
| Vinyltriacetoxysilane | 0.05–5.0 |
| Silica | 100–500 |
| [An aromatic nitroso or a p-quinonedioxime compound of the class consisting of: N(2-methyl-2-nitropropyl)-4-nitrosoaniline, poly-p-dinitrosobenzene, and ] | |
| p,p'-Dibenzoyl-quinonedioxime | 0.5–5.0 |
| Calcium stearate | 0.5–5.0. |

* * * * *